May 2, 1939.  J. GREGORY  2,156,847
GLASS CUTTING APPARATUS
Original Filed Nov. 4, 1937  3 Sheets-Sheet 1

INVENTOR.
JAMES GREGORY
BY Bradley & Bee
ATTORNEYS.

May 2, 1939. J. GREGORY 2,156,847
GLASS CUTTING APPARATUS
Original Filed Nov. 4, 1937 3 Sheets-Sheet 3

INVENTOR.
JAMES GREGORY
BY Bradley & Bee
ATTORNEYS.

Patented May 2, 1939

2,156,847

UNITED STATES PATENT OFFICE 2,156,847

GLASS CUTTING APPARATUS

James Gregory, New Kensington, Pa., assignor to Pittsburgh Plate Glass Company, Allegheny County, Pa., a corporation of Pennsylvania Application November 4, 1937, Serial No. 172,705
Renewed March 14, 1939

7 Claims. (Cl. 33—27)

The invention relates to glass cutting apparatus of the type shown in the patent to Normal H. Klages, No. 2,048,935, dated July 28, 1936, wherein a ring-like cam or template is employed to guide the movements of a cutter head mounted for swinging movement in a horizontal plane above a vertically movable table carrying the glass sheet which is to be scored along a path governed by the cam, the head being supported against vertical movement so that the necessary movement of approach between the glass sheet and the cutter is accomplished by the movement of the table.

One object of the invention is to provide a cutter head for use in the relation above set forth which is much simpler and lighter than those heretofore proposed, such as that of the patent, thus permitting higher speed of operation without chattering.

A further object is the provision of an improved construction in which the flow of cutting liquid (kerosene or the like) to the scoring tool is controlled by the position of the table carrying the glass sheet, so that there is a flow of liquid to the tool only when the table is in upper or cutting position.

Another further object is the provision of an improved head wherein the extent and weight of the portion of the head lying outward of the vertical axis on which the head is pivoted is reduced to a minimum, thus reducing the inertia tending to twist the head in passing around sharp angles, so that better cutting is secured at such time and the cutting of more acute angles is possible.

Figure 1:
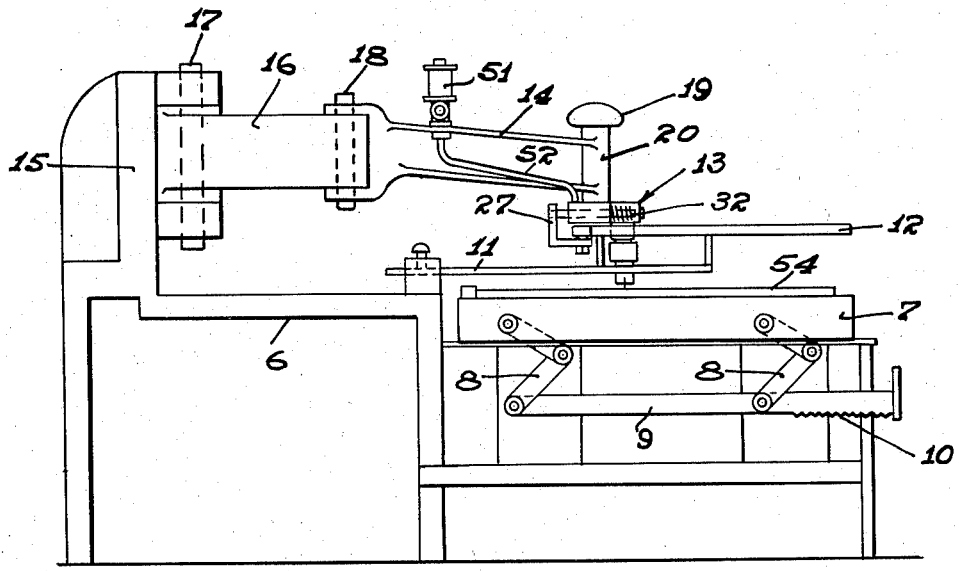
Figure 3:
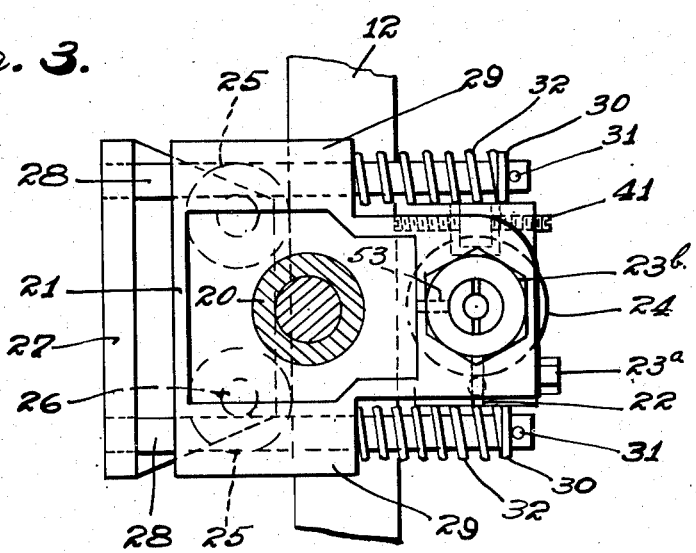
Figure 2:
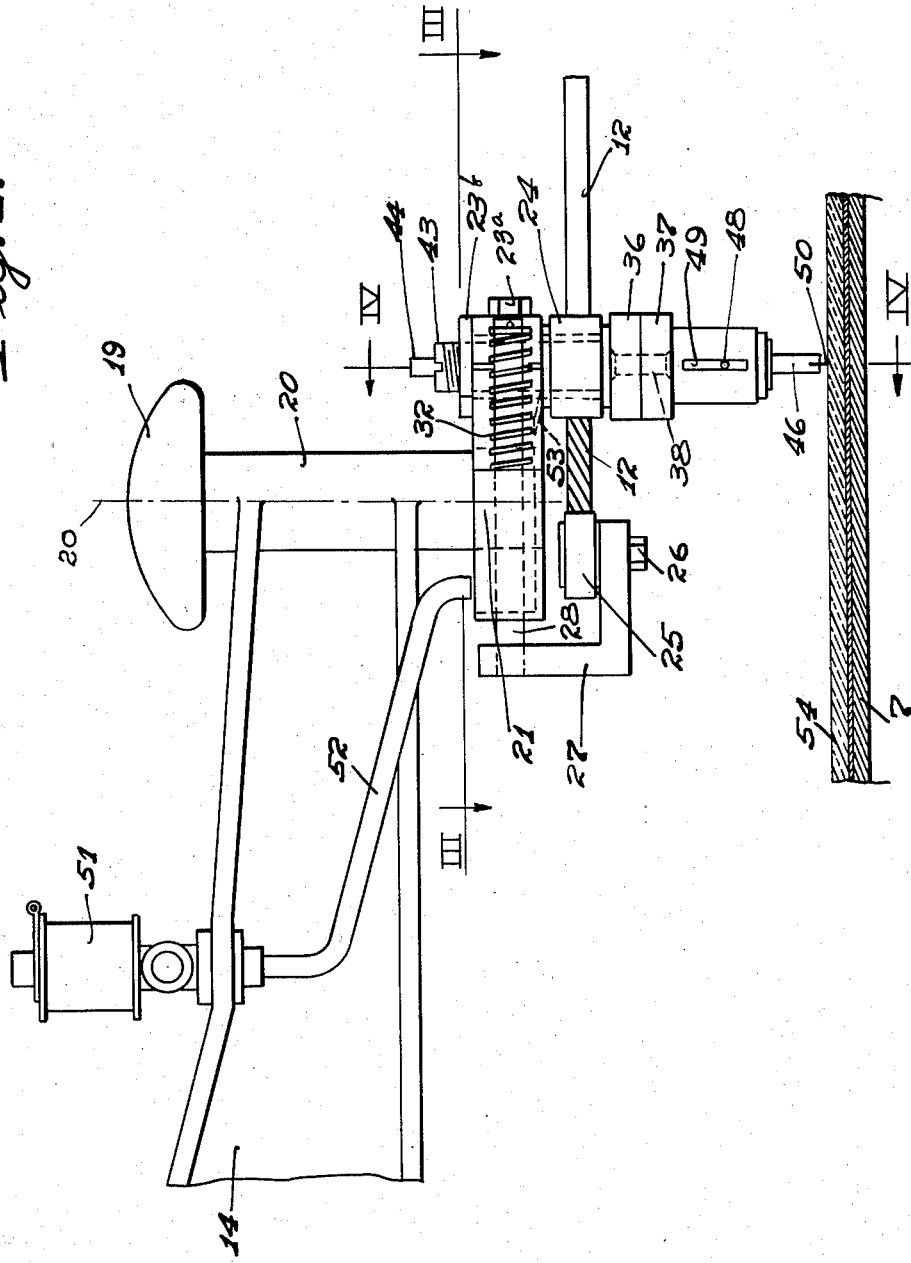
Figure 4:
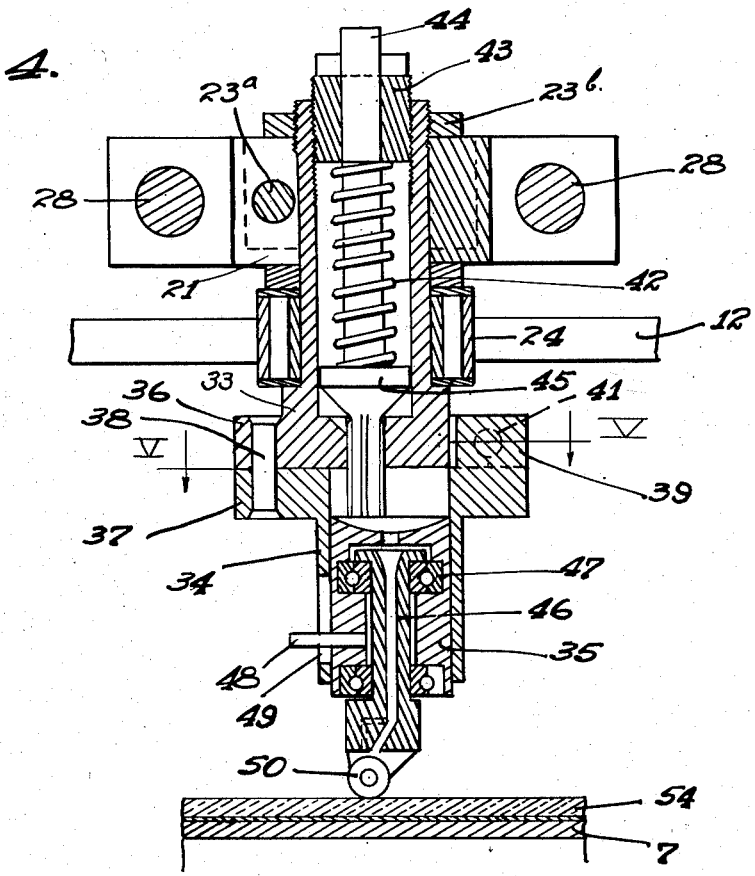
Figure 5:
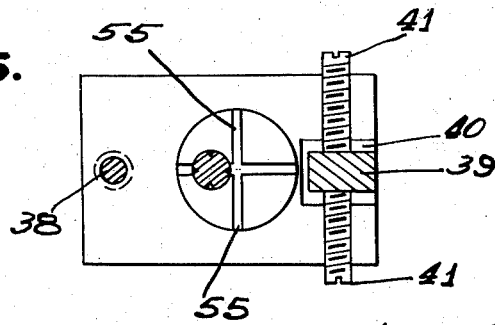

A still further object is the provision of improved means for adjusting the position of the scoring tool with respect to the vertical center line of the head to compensate for wear in the cam. One embodiment of the invention is illustrated in the accompanying drawings, wherein:

Figure 1 is a side elevation showing the general arrangement of parts in the machine. Fig. 2 is a side elevation on an enlarged scale of the part of the apparatus, in which the novelty particularly resides. Fig. 3 is a section on the line III—III of Fig. 2. Fig. 4 is a section on the line IV—IV of Fig. 2. And Fig. 5 is a section on the line V—V of Fig. 4.

Referring to the general arrangement of parts, which is similar to that of the Klages patent heretofore referred to, 6 is the framework of the machine, and 7 is the table which carries the glass sheet and which is mounted for vertical movement to bring the glass carried on the table into and out of engagement with the cutter tool, the latter being held against vertical movement. The up and down movement of the table is accomplished by two pairs of bell crank levers 8, 8 connected to the rod 9. This rod is notched, as indicated at 10 and slides over a detent carried by the frame so that it is held in position to which it is adjusted. The table is moved up and down by moving the rod in and out. Mounted above the table on the supports 11 is the ring cam 12 which governs the movement of the cutter head and the line of cut upon the glass plate. The cutter head 13 to which the invention is particularly directed is mounted for swinging movement above the table in a horizontal plane, so that the cutter head is free to follow the contour of the cam and for this purpose is pivotally mounted upon the arm 14, which is in turn supported from the bracket 15 on the frame by means of the swinging arm 16 pivoted to the frame at 17 and to the arm 16, as indicated at 18.

The arm 14 is provided at its end with a handle 19 to which the cutter head is pivoted on the vertical axis 20 (Fig. 2) by means extending through the body portion of the head and into the stem of the handle, thus permitting a rocking action of the head as the operator moves the head around the cam. The cutter head comprises a body portion 21 in the form of a pan for receiving the cutting fluid or lubricant and a depending barrel portion, which extends through an opening in one end of the body portion. This end of the body portion is slotted on one side, as indicated at 22 in Fig. 3 and a clamping bolt 23a extends transversely of this slot so that after the barrel is assembled in the body portion and the bolt is tightened, the two parts are securely fastened together. A nut 23b threaded on the upper end of the barrel adds to the security of the attachment between the body portion and the barrel.

The cutter head is engaged with the cam 12 by means of the roller sleeve 24 swivelled on the upper portion of the barrel and engaging the cam on one side and the two rollers 25, 25, which engage the other side of the cam. The rollers are pivoted on pins 26 carried by a bracket 27, which is in the form of an angle. This angle is guided for horizontal movement relative to the body portion 21 by means of two bolts 28, 28 riveted to the angle and extending through the lugs 29, 29 (Fig. 3) at the sides of the body portion 21. These bolts carry washers 30 at their other ends secured in position by cotter pins 31, and the springs 32, which are carried on the bolts under tension, tend to cause a relative movement of approach between the rolls 25, 25 and the roller sleeve 24, so that the cam is yieldingly engaged on its opposite sides by these roller means.

The barrel of the cutter head is made up of the upper section 33 (Fig. 4), which carries the sleeve 24, and the lower section 34, which carries the cutter barrel or carrier 35. The two portions of the barrel are provided at their opposing ends with flanges 36 and 37 which are pivoted together on one side of the axis of the barrel by means of the vertical pin 38. The flange 37 on the other side of the barrel is provided with a tongue 39 (Fig. 5), which projects upwardly into a slot 40 in the flange 36. Set screws 41 engage the opposite sides of the tongue. Means are thus provided for giving a movement of adjustment to the lower section of the barrel with respect to the upper section. This in turn adjusts the cutting tool in and out slightly, and this requirement is desirable, because of the wear which occurs in the cam 12. This would affect the position of the line of cut, if some adjustment were not provided, as above set forth. This adjustment is relatively slight, as a new cam is required when it becomes worn excessively. The barrel sections are hollow, as indicated in Fig. 4, to provide for the passage of lubricant and to carry the spring 42 which maintains the cutting tool under yielding pressure and controls the flow of cutting fluid through the barrel to the cutting tool, as later described. The tension of the spring is adjusted by means of a plug 43 threaded into the upper end of the barrel section and carrying a rod 44, which acts as a guide for the spring. The lower end of the spring bears upon the head of the valve 45 and the stem of this valve in turn engages the upper end of the cutter carrier 35. This cutter carrier has a hollow spindle 46 swivelled therein on the balls 47 and is movable up and down in the lower end of the barrel section 34. A stop pin 48 (Fig. 2) working in the slot 49 serves to limit the vertical and rotary movement of the cutter carrier in the barrel. The spindle is provided with a passage therethrough for the passage of cutting fluid and carries at its lower end the cutting tool 50.

Lubricant is supplied to the body portion 21 of the head, which is in the form of a pan, (Figs. 2 and 3) from the container 51 on the arm, the flow occurring through the conduit 52. The cutting fluid, such as kerosene, thus supplied to the pan flows to the interior of the barrel through a suitable perforation 53 extending through the wall of such barrel. When the parts are in the position shown in Fig. 4 with the table in its upper cutting position, the glass sheet 54 presses the cutter carrier 35 up, opening the valve 45 and tensioning the spring 42. The proper cutting pressure between the tool and the glass is thus provided and at the same time, the opening of the valve 45 permits a flow of cutting fluid downward through the barrel and carrier to the tool. After the cut is complete and the table is moved downward, the glass is carried away from the cutting tool, and the spring 42 closes the valve 45, so that no loss of fluid occurs during the period between the cutting operations. In order to promote the flow of fluid downward along the stem of the valve 45, such stem is suitably grooved as indicated in Fig. 4. The upper end of the carrier 35, which is engaged by the end of the valve stem, is provided with cross grooves, as indicated at 55 in Fig. 5, in order to provide a free flow of the cutting fluid to the perforation in the carrier which leads to the passage through the cutter spindle. The simplicity of the structure, as compared with previous structures will be apparent, as well as the light weight and the relatively small amount of overhang of the head on opposite sides of the cam 12. This relatively light weight and lack of overhang of heavy parts renders the device less subject to chattering in operation and permits the head to be carried around sharp curves at a higher rate of speed without interfering with the action of the cutter tool, as the inertia of the parts of the head in passing around a sharp corner at a rapid speed tends to twist the barrel and move the cutting wheel from its proper line of travel. Other advantages incident to the construction, including the saving of cutting fluid because of the automatic cut-off feature, as heretofore described, will be readily apparent to those skilled in the art.

What I claim is:

1. In a machine including a vertically movable table for carrying the glass sheet to be cut, an arm mounted for horizontal movement over the table and a horizontal cam in fixed position above the table, a cutter head pivotally supported on the arm and guided on the cam, a cutter carrier mounted for vertical movement in the head, a cutting tool carried by the end of the carrier, a container for cutting fluid on the arm provided with a conduit discharging to the head, a communication through the head and carrier for conducting the cutting fluid to the cutting tool, an upwardly opening valve in said communication and spring means yieldingly closing the valve and pressing the carrier downward when the table is in its lower position but adapted to be opened by the carrier when the table is raised and the carrier is moved upward by the glass sheet on the table.

2. In a machine including a vertically movable table for carrying the glass sheet to be cut, an arm mounted for horizontal movement over the table and a horizontal cam in fixed position above the table, a cutter head guided on the cam having a vertical passage therethrough pivotally supported on the arm, a cutter carrier having a vertical passage therethrough mounted for vertical movement in the lower end of the head, a cutting tool carried at the lower end of the carrier, an upwardly opening valve in the passage in the head above the carrier and engaging the end thereof, spring means in the head normally pressing the valve downward to closed position and holding the carrier in its lower position, and means on the arm for supplying cutting fluid to the passage through the head, the upward movement of the table to operative position being adapted to move the carrier upward against the resistance of the spring means and open said valve.

3. In a machine including a vertically movable table for carrying the glass sheet to be cut, an arm mounted for horizontal movement over the table and a horizontal cam in fixed position above the table, a cutter head guided on the cam having a vertical passage therethrough pivotally supported on the arm, a cutter carrier having a vertical passage therethrough mounted for vertical movement in the lower end of the head, a cutting tool carried at the lower end of the carrier, an upwardly opening valve in the passage in the head above the carrier and engaging the end thereof, spring means in the head normally pressing the valve downward to closed position and holding the carrier in its lower position, a container on the upper end of the head communicating with the passage therethrough, and a container for the cutter fluid on the arm arranged to discharge to the container on the head, the upward movement of the table to operative position being adapted to move the carrier upward against the resistance of the spring means and open said valve.

4. In a machine including a table for carrying the glass sheet to be cut, an arm mounted for horizontal movement over the table and a horizontal cam in fixed position above the table, a cutter head comprising a horizontal body portion pivoted on a vertical axis to the end of the arm and a depending cylindrical barrel at one end of the body portion, a cutter carrier mounted for vertical movement in the lower end of the barrel, a cutter tool mounted on the lower end of the carrier, means in the barrel yieldingly pressing the carrier downward, a roller sleeve on the barrel coaxial therewith engaging one side of the cam, a bracket supported on the body portion of the head for sliding movement in a horizontal plane toward and from the barrel, a pair of spaced rollers mounted on the bracket and engaging the cam on the side thereof opposite to the sleeve, and spring means yieldingly drawing the bracket toward said barrel.

5. In a machine including a table for carrying the glass sheet to be cut, an arm mounted for horizontal movement over the table and a horizontal cam in fixed position above the table, a cutter head comprising a horizontal body portion pivoted on a vertical axis to the end of the arm and a depending cylindrical barrel at one end of the body portion, a cutter carrier mounted for vertical movement in the lower end of the barrel, a cutter tool mounted on the lower end of the carrier, means in the barrel yieldingly pressing the carrier downward, a roller sleeve rotatable on the barrel coaxial therewith engaging one side of the cam, a pair of horizontal rods slidable through the body portion of the head on opposite sides of the barrel, a bracket secured to the ends of the rods remote from the barrel, a pair of spaced rollers mounted on vertical axes on the bracket and engaging the cam on the side thereof opposite to the sleeve, and a spring on each rod applying yielding force tending to cause movement of approach between the bracket and the barrel.

6. In a machine including a table for carrying the glass sheet to be cut, an arm mounted for horizontal movement over the table, and a horizontal cam in fixed position above the table, a cutter head comprising a horizontal body portion pivoted on a vertical axis to the end of the arm and a depending cylindrical barrel at one end of the body portion, said barrel consisting of two parts pivotally connected on a vertical axis at one side of the barrel, a cutter carrier mounted for vertical movement in the lower section of the barrel, a cutter tool mounted on the lower end of the carrier, means for adjusting the lower section of the barrel with respect to the upper section about said vertical axis and for securing it in adjusted position, and roller means carried by the cutter head on opposite sides of the cam and held in yielding engagement therewith.

7. In a machine including a vertically movable table for carrying the glass sheet to be cut, an arm mounted for horizontal movement over the table and a horizontal cam in fixed position above the table, a cutter head comprising a horizontal body portion pivoted on a vertical axis to the end of the arm and a depending cylindrical barrel at one end of the body portion, said barrel consisting of two parts pivotally connected on a vertical axis at one side of the barrel, a cutter carrier mounted for vertical movement in the lower section of the barrel, a cutter tool mounted on the lower end of the carrier, means for adjusting the lower section of the barrel with respect to the upper section about said vertical axis and for securing it in adjusted position, comprising a tongue on one section of the barrel and a pair of screws in the other section of the barrel engaging the opposite sides of the tongue, and roller means carried by the cutter head on opposite sides of the cam and held in yielding engagement therewith.

JAMES GREGORY.